(12) United States Patent
Wang et al.

(10) Patent No.: US 12,021,759 B2
(45) Date of Patent: Jun. 25, 2024

(54) PACKET PROCESSING WITH HARDWARE OFFLOAD UNITS

(71) Applicant: VMware LLC, Palo Alto, CA (US)

(72) Inventors: Yong Wang, Sunnyvale, CA (US);
Boon S. Ang, Saratoga, CA (US);
Guolin Yang, San Jose, CA (US);
Wenyi Jiang, Fremont, CA (US)

(73) Assignee: VMware LLC, Palo Alto, CA (US)

( * ) Notice: Subject to any disclaimer, the term of this patent is extended or adjusted under 35 U.S.C. 154(b) by 197 days.

(21) Appl. No.: 17/091,663

(22) Filed: Nov. 6, 2020

(65) Prior Publication Data

US 2022/0103488 A1  Mar. 31, 2022

Related U.S. Application Data

(60) Provisional application No. 63/084,425, filed on Sep. 28, 2020.

(51) Int. Cl.
*H04L 12/933* (2013.01)
*H04L 49/1546* (2022.01)

(52) U.S. Cl.
CPC ................................. *H04L 49/1546* (2013.01)

(58) Field of Classification Search
CPC .......................... H04L 49/1546; G06F 13/385
See application file for complete search history.

(56) References Cited

U.S. PATENT DOCUMENTS

| 5,884,313 A | 3/1999 | Talluri et al. |
| 5,887,134 A | 3/1999 | Ebrahim |
| 5,974,547 A | 10/1999 | Klimenko |
| 6,219,699 B1 | 4/2001 | McCloghrie et al. |
| 6,393,483 B1 | 5/2002 | Latif et al. |

(Continued)

FOREIGN PATENT DOCUMENTS

| CA | 2672100 A1 | 6/2008 |
| CA | 2918551 A1 | 7/2010 |

(Continued)

OTHER PUBLICATIONS

Author Unknown, "An Introduction to SmartNICs" The Next Platform, Mar. 4, 2019, 4 pages, retrieved from https://www.nextplatform.com/2019/03/04/an-introduction-to-smartnics/.

(Continued)

*Primary Examiner* — Luat Phung
(74) *Attorney, Agent, or Firm* — Quarles & Brady LLP

(57) ABSTRACT

Some embodiments of the invention provide a method for configuring multiple hardware offload units of a host computer to perform operations on packets associated with machines (e.g., virtual machines or containers) executing on the host computer and to pass the packets between each other efficiently. For instance, in some embodiments, the method configures a program executing on the host computer to identify a first hardware offload unit that has to perform a first operation on a packet associated with a particular machine and to provide the packet to the first hardware offload unit. The packet in some embodiments is a packet that the particular machine has sent to a destination machine on the network, or is a packet received from a source machine through a network and destined to the particular machine.

20 Claims, 9 Drawing Sheets

(56) References Cited

U.S. PATENT DOCUMENTS

| | | |
|---|---|---|
| 6,496,935 B1 | 12/2002 | Fink et al. |
| 7,079,544 B2 | 7/2006 | Wakayama et al. |
| 7,424,710 B1 | 9/2008 | Nelson et al. |
| 7,606,260 B2 | 10/2009 | Oguchi et al. |
| 7,849,168 B2 | 12/2010 | Utsunomiya et al. |
| 8,346,919 B1 | 1/2013 | Eiriksson et al. |
| 8,442,059 B1 | 5/2013 | Iglesia et al. |
| 8,660,129 B1 | 2/2014 | Brendel et al. |
| 8,825,900 B1 | 9/2014 | Gross et al. |
| 8,856,518 B2 | 10/2014 | Sridharan et al. |
| 8,931,047 B2 | 1/2015 | Wanser et al. |
| 9,008,085 B2 | 4/2015 | Kamble et al. |
| 9,116,727 B2 | 8/2015 | Benny et al. |
| 9,135,044 B2 | 9/2015 | Maharana |
| 9,143,582 B2 | 9/2015 | Banavalikar et al. |
| 9,152,593 B2 | 10/2015 | Galles |
| 9,154,327 B1 | 10/2015 | Marino et al. |
| 9,197,551 B2 | 11/2015 | DeCusatis et al. |
| 9,231,849 B2 | 1/2016 | Hyoudou et al. |
| 9,378,161 B1* | 6/2016 | Dalal .................. G06F 13/16 |
| 9,419,897 B2 | 8/2016 | Cherian et al. |
| 9,460,031 B1 | 10/2016 | Dalal et al. |
| 9,692,698 B2 | 6/2017 | Cherian et al. |
| 9,697,019 B1 | 7/2017 | Fitzgerald et al. |
| 9,916,269 B1 | 3/2018 | Machulsky et al. |
| 9,952,782 B1 | 4/2018 | Chandrasekaran et al. |
| 10,050,884 B1 | 8/2018 | Dhanabalan et al. |
| 10,142,127 B2 | 11/2018 | Cherian et al. |
| 10,162,793 B1 | 12/2018 | BShara et al. |
| 10,193,771 B2 | 1/2019 | Koponen et al. |
| 10,284,478 B2 | 5/2019 | Yokota |
| 10,534,629 B1 | 1/2020 | Pierre et al. |
| 10,567,308 B1 | 2/2020 | Subbiah et al. |
| 10,997,106 B1 | 5/2021 | Bandaru et al. |
| 11,108,593 B2 | 8/2021 | Cherian et al. |
| 11,221,972 B1 | 1/2022 | Raman et al. |
| 11,385,981 B1 | 7/2022 | Silakov et al. |
| 2002/0069245 A1 | 6/2002 | Kim |
| 2003/0130833 A1 | 7/2003 | Brownell et al. |
| 2003/0140124 A1* | 7/2003 | Burns ................. H04L 49/9063 709/227 |
| 2003/0145114 A1 | 7/2003 | Gertner |
| 2003/0200290 A1 | 10/2003 | Zimmerman et al. |
| 2003/0217119 A1 | 11/2003 | Raman et al. |
| 2004/0042464 A1 | 3/2004 | Elzur et al. |
| 2005/0053079 A1 | 3/2005 | Havala |
| 2006/0029056 A1 | 2/2006 | Perera et al. |
| 2006/0041894 A1 | 2/2006 | Cheng et al. |
| 2006/0206603 A1 | 9/2006 | Rajan et al. |
| 2006/0206655 A1 | 9/2006 | Chappell et al. |
| 2006/0236054 A1 | 10/2006 | Kitamura |
| 2007/0174850 A1 | 7/2007 | Zur |
| 2008/0008202 A1 | 1/2008 | Terrell et al. |
| 2008/0086620 A1 | 4/2008 | Morris |
| 2008/0267177 A1 | 10/2008 | Johnson et al. |
| 2009/0089537 A1 | 4/2009 | Vick et al. |
| 2009/0119087 A1 | 5/2009 | Ang et al. |
| 2009/0161547 A1 | 6/2009 | Riddle et al. |
| 2009/0161673 A1 | 6/2009 | Breslau et al. |
| 2010/0070677 A1 | 3/2010 | Thakkar |
| 2010/0115208 A1 | 5/2010 | Logan |
| 2010/0131669 A1* | 5/2010 | Srinivas ................. G06F 9/452 709/233 |
| 2010/0165874 A1 | 7/2010 | Brown et al. |
| 2010/0275199 A1 | 10/2010 | Smith et al. |
| 2010/0287306 A1 | 11/2010 | Matsuda |
| 2011/0060859 A1 | 3/2011 | Shukla et al. |
| 2011/0219170 A1 | 9/2011 | Frost et al. |
| 2012/0042138 A1 | 2/2012 | Eguchi et al. |
| 2012/0072909 A1 | 3/2012 | Malik et al. |
| 2012/0079478 A1 | 3/2012 | Galles et al. |
| 2012/0096459 A1 | 4/2012 | Miyazaki |
| 2012/0163388 A1 | 6/2012 | Goel et al. |
| 2012/0167082 A1 | 6/2012 | Kumar et al. |
| 2012/0259953 A1 | 10/2012 | Gertner |
| 2012/0278584 A1 | 11/2012 | Nagami et al. |
| 2012/0320918 A1 | 12/2012 | Fomin et al. |
| 2013/0033993 A1 | 2/2013 | Cardona et al. |
| 2013/0058346 A1 | 3/2013 | Sridharan et al. |
| 2013/0061047 A1 | 3/2013 | Sridharan et al. |
| 2013/0073702 A1 | 3/2013 | Umbehocker |
| 2013/0125122 A1 | 5/2013 | Hansen |
| 2013/0145106 A1 | 6/2013 | Kan |
| 2013/0311663 A1 | 11/2013 | Kamath et al. |
| 2013/0318219 A1 | 11/2013 | Kancherla |
| 2013/0318268 A1 | 11/2013 | Dalal et al. |
| 2014/0003442 A1 | 1/2014 | Hernandez et al. |
| 2014/0056151 A1 | 2/2014 | Petrus et al. |
| 2014/0067763 A1 | 3/2014 | Jorapurkar et al. |
| 2014/0074799 A1 | 3/2014 | Karampuri et al. |
| 2014/0098815 A1 | 4/2014 | Mishra et al. |
| 2014/0115578 A1 | 4/2014 | Cooper et al. |
| 2014/0123211 A1 | 5/2014 | Wanser et al. |
| 2014/0208075 A1 | 7/2014 | McCormick, Jr. |
| 2014/0215036 A1* | 7/2014 | Elzur ................... H04L 41/342 709/223 |
| 2014/0244983 A1* | 8/2014 | McDonald ............ G06F 9/5044 712/225 |
| 2014/0245296 A1 | 8/2014 | Sethuramalingam et al. |
| 2014/0269712 A1 | 9/2014 | Kidambi |
| 2014/0269754 A1 | 9/2014 | Eguchi et al. |
| 2015/0007317 A1 | 1/2015 | Jain |
| 2015/0016300 A1 | 1/2015 | Devireddy et al. |
| 2015/0019748 A1 | 1/2015 | Gross, IV et al. |
| 2015/0020067 A1 | 1/2015 | Brant et al. |
| 2015/0033222 A1 | 1/2015 | Hussain et al. |
| 2015/0052280 A1 | 2/2015 | Lawson |
| 2015/0117445 A1 | 4/2015 | Koponen et al. |
| 2015/0156250 A1 | 6/2015 | Varshney et al. |
| 2015/0172183 A1 | 6/2015 | DeCusatis et al. |
| 2015/0200808 A1 | 7/2015 | Gourlay et al. |
| 2015/0212892 A1* | 7/2015 | Li ......................... G06F 9/3877 707/649 |
| 2015/0215207 A1 | 7/2015 | Qin et al. |
| 2015/0222547 A1 | 8/2015 | Hayut et al. |
| 2015/0242134 A1 | 8/2015 | Takada et al. |
| 2015/0261556 A1 | 9/2015 | Jain et al. |
| 2015/0261720 A1 | 9/2015 | Kagan et al. |
| 2015/0347231 A1 | 12/2015 | Gopal et al. |
| 2015/0358288 A1 | 12/2015 | Jain et al. |
| 2015/0358290 A1 | 12/2015 | Jain et al. |
| 2015/0381494 A1 | 12/2015 | Cherian et al. |
| 2015/0381495 A1 | 12/2015 | Cherian et al. |
| 2016/0006696 A1 | 1/2016 | Donley et al. |
| 2016/0092108 A1 | 3/2016 | Karaje et al. |
| 2016/0134702 A1 | 5/2016 | Gertner |
| 2016/0162302 A1 | 6/2016 | Warszawski et al. |
| 2016/0162438 A1 | 6/2016 | Hussain et al. |
| 2016/0179579 A1 | 6/2016 | Amann et al. |
| 2016/0182342 A1 | 6/2016 | Singaravelu et al. |
| 2016/0306648 A1 | 10/2016 | Deguillard et al. |
| 2017/0024334 A1 | 1/2017 | Bergsten et al. |
| 2017/0075845 A1 | 3/2017 | Kopparthi |
| 2017/0093623 A1 | 3/2017 | Zheng |
| 2017/0099532 A1 | 4/2017 | Kakande |
| 2017/0161090 A1 | 6/2017 | Kodama |
| 2017/0161189 A1 | 6/2017 | Gertner |
| 2017/0214549 A1 | 7/2017 | Yoshino et al. |
| 2017/0295033 A1 | 10/2017 | Cherian et al. |
| 2018/0024775 A1 | 1/2018 | Miller |
| 2018/0024964 A1 | 1/2018 | Mao et al. |
| 2018/0032249 A1 | 2/2018 | Makhervaks et al. |
| 2018/0088978 A1 | 3/2018 | Li et al. |
| 2018/0095872 A1 | 4/2018 | Dreier et al. |
| 2018/0109471 A1 | 4/2018 | Chang et al. |
| 2018/0152540 A1 | 5/2018 | Niell et al. |
| 2018/0203719 A1 | 7/2018 | Zhang et al. |
| 2018/0260125 A1 | 9/2018 | Botes et al. |
| 2018/0262599 A1 | 9/2018 | Firestone |
| 2018/0278684 A1 | 9/2018 | Rashid et al. |
| 2018/0309641 A1 | 10/2018 | Wang et al. |
| 2018/0309718 A1 | 10/2018 | Zuo |
| 2018/0329743 A1 | 11/2018 | Pope et al. |
| 2018/0331976 A1 | 11/2018 | Pope et al. |

(56) References Cited

U.S. PATENT DOCUMENTS

| | | |
|---|---|---|
| 2018/0336346 A1 | 11/2018 | Guenther |
| 2018/0337991 A1 | 11/2018 | Kumar et al. |
| 2018/0349037 A1 | 12/2018 | Zhao et al. |
| 2018/0359215 A1 | 12/2018 | Khare et al. |
| 2019/0042506 A1 | 2/2019 | Devey et al. |
| 2019/0044809 A1 | 2/2019 | Willis et al. |
| 2019/0044866 A1 | 2/2019 | Chilikin et al. |
| 2019/0075063 A1 | 3/2019 | McDonnell et al. |
| 2019/0132296 A1 | 5/2019 | Jiang et al. |
| 2019/0158396 A1 | 5/2019 | Yu et al. |
| 2019/0173689 A1 | 6/2019 | Cherian et al. |
| 2019/0200105 A1 | 6/2019 | Cheng et al. |
| 2019/0235909 A1 | 8/2019 | Jin et al. |
| 2019/0278675 A1 | 9/2019 | Bolkhovitin et al. |
| 2019/0280980 A1* | 9/2019 | Hyoudou ............ H04L 49/101 |
| 2019/0286373 A1 | 9/2019 | Karumbunathan et al. |
| 2019/0306083 A1 | 10/2019 | Shih et al. |
| 2020/0021532 A1 | 1/2020 | Borikar et al. |
| 2020/0028800 A1 | 1/2020 | Strathman et al. |
| 2020/0042234 A1 | 2/2020 | Krasner et al. |
| 2020/0042389 A1 | 2/2020 | Kulkarni et al. |
| 2020/0042412 A1 | 2/2020 | Kulkarni et al. |
| 2020/0133909 A1 | 4/2020 | Hefty et al. |
| 2020/0136996 A1 | 4/2020 | Li et al. |
| 2020/0213227 A1 | 7/2020 | Pianigiani et al. |
| 2020/0259731 A1 | 8/2020 | Sivaraman et al. |
| 2020/0278892 A1 | 9/2020 | Nainar et al. |
| 2020/0278893 A1 | 9/2020 | Niell et al. |
| 2020/0314011 A1 | 10/2020 | Deval et al. |
| 2020/0319812 A1 | 10/2020 | He et al. |
| 2020/0328192 A1 | 10/2020 | Zaman et al. |
| 2020/0382329 A1 | 12/2020 | Yuan |
| 2020/0401320 A1 | 12/2020 | Pyati et al. |
| 2020/0412659 A1 | 12/2020 | Ilitzky et al. |
| 2021/0019270 A1 | 1/2021 | Li et al. |
| 2021/0026670 A1 | 1/2021 | Krivenok et al. |
| 2021/0058342 A1 | 2/2021 | McBrearty |
| 2021/0117360 A1* | 4/2021 | Kutch ................. G06F 13/4027 |
| 2021/0226846 A1 | 7/2021 | Ballard et al. |
| 2021/0232528 A1 | 7/2021 | Kutch et al. |
| 2021/0266259 A1 | 8/2021 | Renner, III et al. |
| 2021/0314232 A1 | 10/2021 | Nainar et al. |
| 2021/0357242 A1 | 11/2021 | Ballard et al. |
| 2021/0377166 A1 | 12/2021 | Brar et al. |
| 2021/0377188 A1 | 12/2021 | Ghag et al. |
| 2021/0392017 A1 | 12/2021 | Cherian et al. |
| 2021/0409317 A1 | 12/2021 | Seshan et al. |
| 2022/0027147 A1 | 1/2022 | Maddukuri et al. |
| 2022/0043572 A1 | 2/2022 | Said et al. |
| 2022/0100432 A1 | 3/2022 | Kim et al. |
| 2022/0100491 A1 | 3/2022 | Voltz et al. |
| 2022/0100542 A1 | 3/2022 | Voltz |
| 2022/0100544 A1 | 3/2022 | Voltz |
| 2022/0100545 A1 | 3/2022 | Cherian et al. |
| 2022/0100546 A1 | 3/2022 | Cherian et al. |
| 2022/0103478 A1 | 3/2022 | Ang et al. |
| 2022/0103487 A1 | 3/2022 | Ang et al. |
| 2022/0103488 A1* | 3/2022 | Wang ................... G06F 13/385 |
| 2022/0103490 A1 | 3/2022 | Kim et al. |
| 2022/0103629 A1 | 3/2022 | Cherian et al. |
| 2022/0150055 A1 | 5/2022 | Cui et al. |
| 2022/0164451 A1 | 5/2022 | Bagwell |
| 2022/0197681 A1 | 6/2022 | Rajagopal |
| 2022/0206908 A1 | 6/2022 | Brar et al. |
| 2022/0206962 A1 | 6/2022 | Kim et al. |
| 2022/0206964 A1 | 6/2022 | Kim et al. |
| 2022/0210229 A1 | 6/2022 | Maddukuri et al. |
| 2022/0231968 A1 | 7/2022 | Rajagopal |
| 2022/0272039 A1 | 8/2022 | Cardona et al. |
| 2022/0335563 A1 | 10/2022 | Elzur |
| 2023/0004508 A1 | 1/2023 | Liu et al. |

FOREIGN PATENT DOCUMENTS

| | | |
|---|---|---|
| CN | 101540826 A | 9/2009 |
| DE | 102018004046 A1 | 11/2018 |
| EP | 1482711 A2 | 12/2004 |
| EP | 3598291 A1 | 1/2020 |
| EP | 4160424 A2 | 4/2023 |
| IN | 101258725 A | 9/2008 |
| TW | 202107297 A | 2/2021 |
| WO | 2005099201 A2 | 10/2005 |
| WO | 2007036372 A1 | 4/2007 |
| WO | 2010008984 A2 | 1/2010 |
| WO | 2016003489 A1 | 1/2016 |
| WO | 2020027913 A1 | 2/2020 |
| WO | 2021030020 A1 | 2/2021 |
| WO | 2022066267 A1 | 3/2022 |
| WO | 2022066268 A1 | 3/2022 |
| WO | 2022066270 A1 | 3/2022 |
| WO | 2022066271 A1 | 3/2022 |
| WO | 2022066531 A1 | 3/2022 |

OTHER PUBLICATIONS

Author Unknown, "In-Hardware Storage Virtualization—NVMe SNAP™ Revolutionizes Data Center Storage: Composable Storage Made Simple," Month Unknown 2019, 3 pages, Mellanox Technologies, Sunnyvale, CA, USA.

Author Unknown, "Package Manager," Wikipedia, Sep. 8, 2020, 10 pages.

Author Unknown, "VMDK", Wikipedia, May 17, 2020, 3 pages, retrieved from https://en.wikipedia.org/w/index.php?title=VMDK&oldid=957225521.

Author Unknown, "vSphere Managed Inventory Objects," Aug. 3, 2020, 3 pages, retrieved from https://docs.vmware.com/en/VMware-vSphere/6.7/com.vmware.vsphere.vcenterhost.doc/GUID-4D4B3DF2-D033-4782-A030-3C3600DE5A7F.html, VMware, Inc.

Grant, Stewart, et al., "SmartNIC Performance Isolation with FairNIC: Programmable Networking for the Cloud," SIGCOMM '20, Aug. 10-14, 2020, 13 pages, ACM, Virtual Event, USA.

Liu, Ming, et al., "Offloading Distributed Applications onto SmartNICs using iPipe," SIGCOMM '19, Aug. 19-23, 2019, 16 pages, ACM, Beijing, China.

PCT International Search Report and Written Opinion of Commonly Owned International Patent Application PCT/US2021/042116, dated Oct. 15, 2021, 14 pages, International Searching Authority (EPO).

Suarez, Julio, "Reduce TCO with Arm Based SmartNICs," Nov. 14, 2019, 12 pages, retrieved from https://community.arm.com/arm-community-blogs/b/architectures-and-processors-blog/posts/reduce-tco-with-arm-based-smartnics.

Non-Published Commonly Owned Related International Patent Application PCT/US2021/042116 with similar specification, filed Jul. 17, 2021, 29 pages, VMware, Inc.

Non-Published Commonly Owned U.S. Appl. No. 17/461,908, filed Aug. 30, 2021, 60 pages, Nicira, Inc.

Anwer, Muhammad Bilal, et al., "Building a Fast, Virtualized Data Plane with Programmable Hardware," Aug. 17, 2009, 8 pages, VISA'09, ACM, Barcelona, Spain.

Author Unknown, "Network Functions Virtualisation; Infrastructure Architecture; Architecture of the Hypervisor Domain," Draft ETSI GS NFV-INF 004 V0.3.1, May 28, 2014, 50 pages, France.

Koponen, Teemu, et al., "Network Virtualization in Multi-tenant Datacenters," Technical Report TR-2013-001E, Aug. 2013, 22 pages, VMware, Inc., Palo Alto, CA, USA.

Le Vasseur, Joshua, et al., "Standardized but Flexible I/O for Self-Virtualizing Devices," Month Unknown 2008, 7 pages.

Non-Published Commonly Owned U.S. Appl. No. 17/107,561, filed Nov. 30, 2020, 39 pages, VMware, Inc.

Non-Published Commonly Owned U.S. Appl. No. 17/107,568, filed Nov. 30, 2020, 39 pages, VMware, Inc.

Non-Published Commonly Owned U.S. Appl. No. 17/114,975, filed Dec. 8, 2020, 52 pages, VMware, Inc.

(56) References Cited

OTHER PUBLICATIONS

Non-Published Commonly Owned U.S. Appl. No. 17/114,994, filed Dec. 8, 2020, 51 pages, VMware, Inc.
Non-Published Commonly Owned U.S. Appl. No. 17/145,318, filed Jan. 9, 2021, 70 pages, VMware, Inc.
Non-Published Commonly Owned U.S. Appl. No. 17/145,319, filed Jan. 9, 2021, 70 pages, VMware, Inc.
Non-Published Commonly Owned U.S. Appl. No. 17/145,320, filed Jan. 9, 2021, 70 pages, VMware, Inc.
Non-Published Commonly Owned U.S. Appl. No. 17/145,321, filed Jan. 9, 2021, 49 pages, VMware, Inc.
Non-Published Commonly Owned U.S. Appl. No. 17/145,322, filed Jan. 9, 2021, 49 pages, VMware, Inc.
Non-Published Commonly Owned U.S. Appl. No. 17/145,329, filed Jan. 9, 2021, 50 pages, VMware, Inc.
Non-Published Commonly Owned U.S. Appl. No. 17/145,334, filed Jan. 9, 2021, 49 pages, VMware, Inc.
Peterson, Larry L., et al., "OS Support for General-Purpose Routers," Month Unknown 1999, 6 pages, Department of Computer Science, Princeton University.
Pettit, Justin, et al., "Virtual Switching in an Era of Advanced Edges," In Proc. 2nd Workshop on Data Center-Converged and Virtual Ethernet Switching (DCCAVES), Sep. 2010, 7 pages, vol. 22. ITC.
Spalink, Tammo, et al., "Building a Robust Software-Based Router Using Network Processors," Month Unknown 2001, 14 pages, ACM, Banff, Canada.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.
Author Unknown, "8.6 Receive-Side Scaling (RSS)," Month Unknown 2020, 2 pages, Red Hat, Inc.
Herbert, Tom, et al., "Scaling in the Linux Networking Stack," Jun. 2, 2020, retrieved from https://01.org/inuxgraphics/gfx-docs/drm/networking/scaling.html.
Non-Published Commonly Owned U.S. Appl. No. 16/890,890, filed Jun. 2, 2020, 39 pages, VMware, Inc.
Stringer, Joe, et al., "OVS Hardware Offloads Discussion Panel," Nov. 7, 2016, 37 pages, retrieved from http://openvswitch.org/support/ovscon2016/7/1450-stringer.pdf.
Author Unknown, "vSAN Planning and Deployment" Update 3, Aug. 20, 2019, 85 pages, VMware, Inc., Palo Alto, CA, USA.
Author Unknown, "What is End-to-End Encryption and How does it Work?," Mar. 7, 2018, 4 pages, Proton Technologies AG, Geneva, Switzerland.
Harris, Jim, "Accelerating NVME-oF* for VMs with the Storage Performance Development Kit," Flash Memory Summit, Aug. 2017, 18 pages, Intel Corporation, Santa Clara, CA.
Perlroth, Nicole, "What is End-to-End Encryption? Another Bull's-Eye on Big Tech," The New York Times, Nov. 19, 2019, 4 pages, retrieved from https://nytimes.com/2019/11/19/technology/end-to-end-encryption.html.
Angeles, Sara, "Cloud vs. Data Center: What's the difference?" Nov. 23, 2018, 1 page, retrieved from https://www.businessnewsdaily.com/4982-cloud-vs-data-center.html.
Author Unknown, "Middlebox," Wikipedia, Nov. 19, 2019, 1 page, Wikipedia.com.
Doyle, Lee, "An Introduction to smart NICs and their Benefits," Jul. 2019, 2 pages, retrieved from https://www.techtarget.com/searchnetworking/tip/An-introduction-to-smart-NICs-and-ther-benefits.
Author Unknown, "Transparent," Free on-Line Dictionary of Computing (FOLDOC), Jun. 6, 1996, 1 page, retrieved from http://foldoc.org/transparent.
Li, Junnan, et al., "DrawerPipe: a Reconfigurable Pipeline for Network Processing on FGPA-Based SmartNIC," Electronics 2020, Dec. 10, 2019, 24 pages, retrieved from https://www.mdpi.com/2079-9292/9/1/59.
Mohammadkhan, Ali, et al., "P4NFV: P4 Enabled NFV Systems with SmartNICs," 2019 IEEE Conference on Network Function Virtualization and Software Defined Networks (NFV-SDN), Nov. 12-14, 2019, 7 pages, IEEE, Dallas, TX, USA.
Olds, Dan, "OS Virtualization vs. Hypervisor: Why You Should Offer Both," Oct. 19, 2008, 3 pages, techtarget.com.

\* cited by examiner

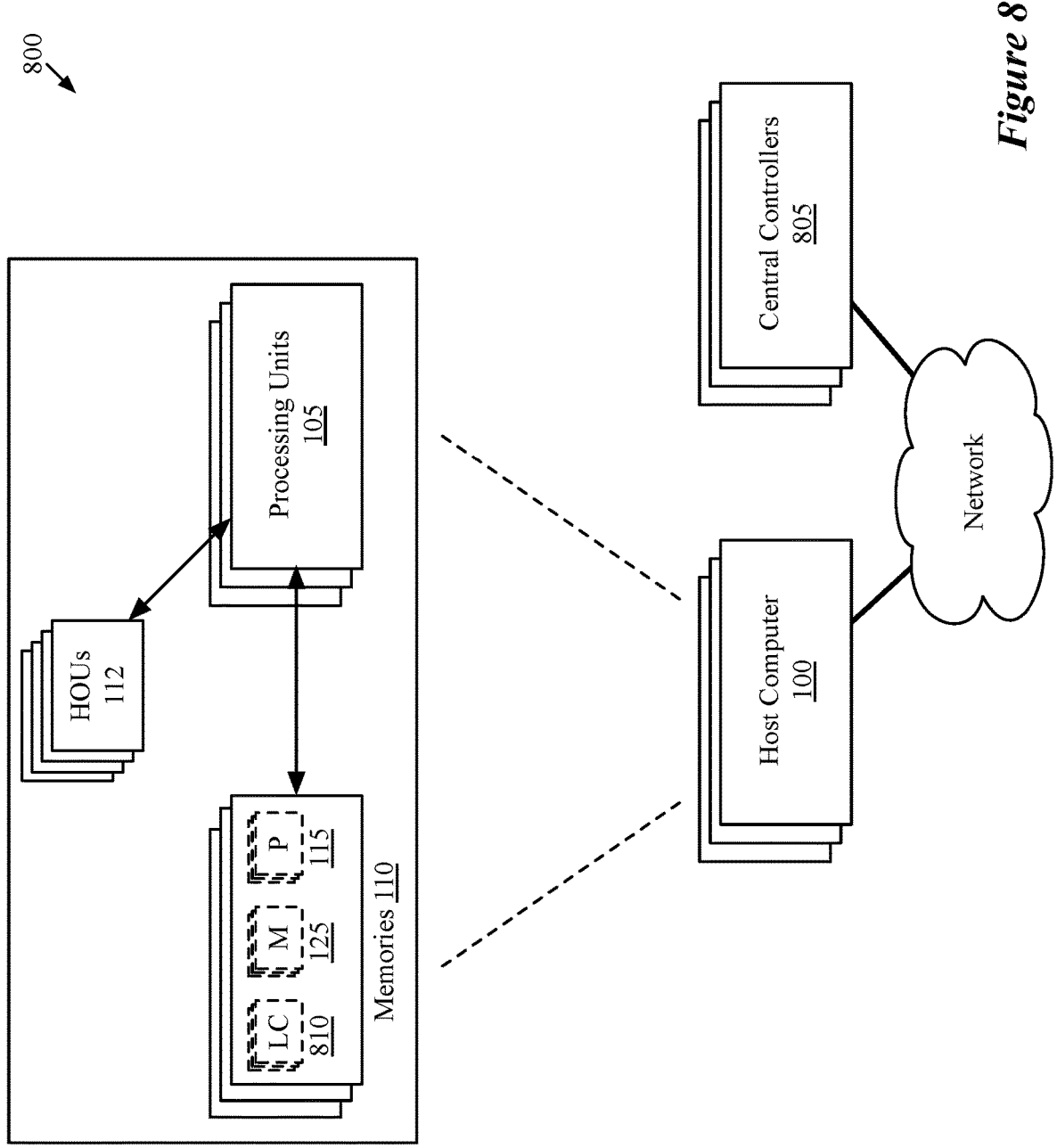

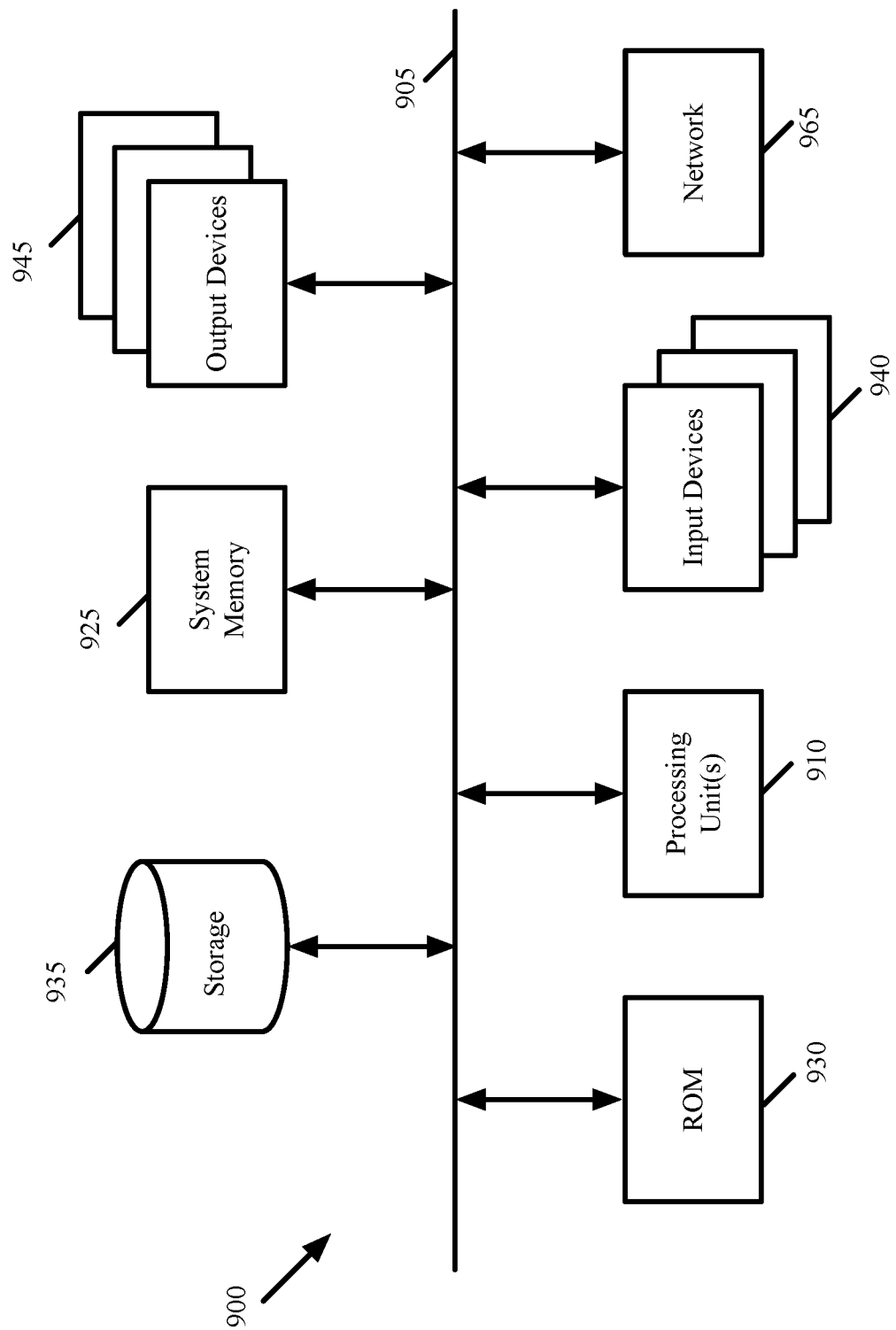

PACKET PROCESSING WITH HARDWARE OFFLOAD UNITS

BACKGROUND

In recent years, there has been an increase in the use of hardware offload units to assist functions performed by programs executing on host computers. Examples of such hardware offload units include FGPAs, GPUs, smartNICs, etc. Such hardware offload units have improved performance and efficiency requirements of the host computers, and are driving towards specialized accelerators in datacenters. However, there has been a lack of solutions for performing a chain of offload operations with several different hardware offload units.

SUMMARY

Some embodiments of the invention provide a method for configuring multiple hardware offload units of a host computer to perform operations on packets associated with machines (e.g., virtual machines or containers) executing on the host computer and to pass the packets between each other efficiently. For instance, in some embodiments, the method configures a program executing on the host computer to identify a first hardware offload unit that has to perform a first operation on a packet associated with a particular machine and to provide the packet to the first hardware offload unit. The packet in some embodiments is a packet that the particular machine has sent to a destination machine on the network, or is a packet received from a source machine through a network and destined to the particular machine.

In addition to configuring the program to provide the packet to the first hardware offload unit, the method also configures the first hardware offload unit to perform the first operation on the packet, to identify a second hardware offload unit that has to perform a second operation on the packet, and to provide the packet to the second hardware offload unit. The method further configures the second hardware offload unit to perform the second operation on the packet.

In some embodiments, the method configures the first hardware offload unit to provide the packet to the second hardware offload unit by writing to a register of the second hardware offload unit. In other embodiments, the process configures a hardware offload unit to provide the packet to another hardware offload unit by writing to a memory of the host computer, and providing a notification to the second hardware offload unit that it needs to retrieve the packet from the host computer's memory.

In some cases, the method of some embodiments configures the second hardware offload unit to provide the packet back to the program after performing the second operation on the packet, while in other cases it configures (1) the second hardware offload unit to provide the packet to a third hardware offload unit after performing the second operation on the packet, and (2) configures the third hardware offload unit to perform a third operation on the packet.

The program that identifies the first hardware offload unit in some embodiments is an operating system of the host computer. In other embodiments, this program is a hypervisor over which virtual machines execute on the host computer. In some embodiment, the program performs an operation on the packet before providing the packet to the first hardware offload unit to perform a first operation and/or performs an operation on the packet after the second hardware offload unit and/or another hardware offload unit has performed an operation on the packet.

The operations performed by the program and the hardware offload units in some embodiments are packet forwarding operations and/or middlebox service operations. Also, in some embodiments, the program and/or hardware offload units use a set of attributes of the packet (e.g., header values of the packet) to identify the packet forwarding and/or middlebox service operation to perform on the packet, and/or to identify the processing program or hardware offload unit that has to process the packet next.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings and the Claims is needed. Moreover, the claimed subject matters are not to be limited by the illustrative details in the Summary, the Detailed Description and the Drawings.

BRIEF DESCRIPTION OF FIGURES

The novel features of the invention are set forth in the appended claims. However, for purposes of explanation, several embodiments of the invention are set forth in the following figures.

FIG. 8 conceptually illustrates a network control system that configures multiple hardware offload units of one or more host computers to perform operations on packets associated with machines executing on these computers and to pass the packets between each other efficiently.

FIG. 9 conceptually illustrates a computer system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for configuring multiple hardware offload units of a host computer to perform operations on packets associated with machines (e.g., virtual machines or containers) executing on the host computer and to pass the packets between each other efficiently. For instance, in some embodiments, the method configures a program (e.g., operating system, hypervisor, etc.) executing on the host computer to identify a first hardware offload unit that has to perform a first operation on a packet associated with a particular machine and to provide the packet to the first hardware offload unit. The method also configures the first hardware offload unit to perform the first operation on the packet, to identify a second hardware offload unit that has to perform a second operation on the packet, and to provide the packet to the second hardware offload unit.

The method further configures the second hardware offload unit to perform the second operation on the packet, and then to provide the packet back to the program, or to provide the packet to a third hardware offload unit, which it configures to perform a third operation on the packet. In some embodiments, the method configures each hardware offload unit to provide the packet after the unit's processing of the packet to another hardware offload unit, or to return the packet back to the program in case the hardware offload unit is the last unit in a chain of units that processes the packet. Also, in some embodiments, the method configures the program to perform operations on the packet before providing the packet to a hardware offload unit, or after receiving the packet from a hardware offload unit.

The operations performed by the program and the hardware offload units in some embodiments are packet forwarding operations and/or middlebox service operations. Also, in some embodiments, the program and/or hardware offload units use a set of attributes of the packet (e.g., header values of the packet) to identify the packet forwarding and/or middlebox service operation to perform on the packet, and/or to identify the processing program or hardware offload unit that has to process the packet next.

Figure 1:
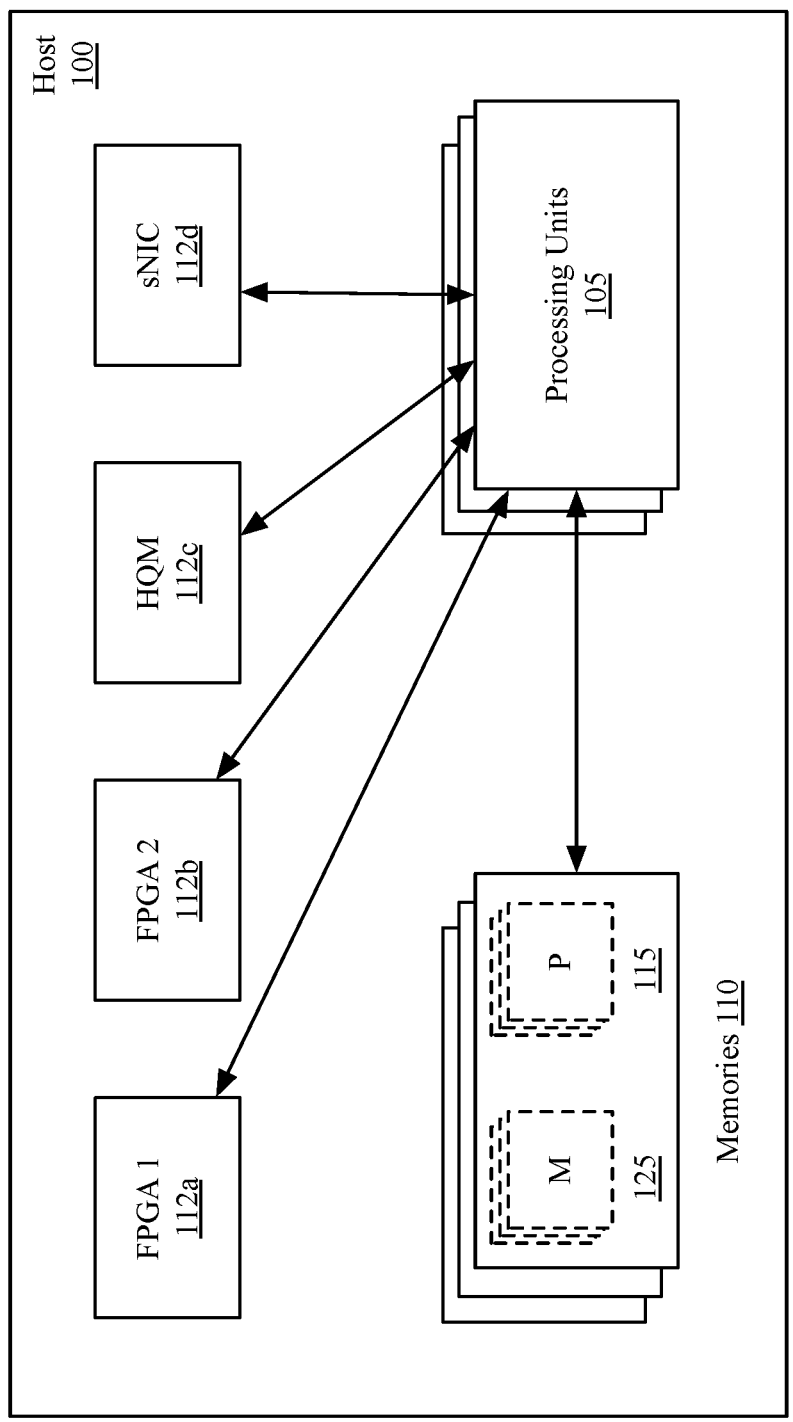
FIG. 1 conceptually illustrates the operation of a host computer and its hardware offload units when these components are configured according to the method of some embodiments.

FIG. 1 illustrates the operation of a host computer 100 and its hardware offload units when these components are configured according to the method of some embodiments. In this example, the host computer has a set of processing units 105 (e.g., processor cores), a set of memories 110 (e.g., volatile and non-volatile memories), and four hardware offload units 112*a-d*. The hardware offload units include two field programmable gate arrays 112*a* and 112*b*, a hardware queue manager 112*c* and a smart network interface card (MC) 112*d*.

The processing units execute one or more software processes 115 and machines 125 that are stored in one or more memories 110. The machines 125 are endpoint machines, such as virtual machines (VMs) or containers in some embodiments. These machines send and receive packets through the physical network interface card (PNIC) of the host computer. In some embodiments, the PNIC of the host computer is a smart NIC 112*d*, which is one of the hardware offload units of the host computer. The software processes 115 are packet processors that perform forwarding operations (L2 switching and L3 routing operations) and/or middlebox service operations (e.g., firewall, load balancing, etc.) on the packets.

In some embodiments, one or more of the software processes 115 are configured to offload one or more operations from the host computer's processing units 105 to the hardware offload units 112*a-d*. Moreover, in some embodiments, each particular hardware offload units can be configured to identify another hardware offload unit that has to perform a subsequent operation on the packet processed by the particular hardware offload unit, and to notify this other hardware offload unit that it needs to process the packet. This is in contrast to a technique that would have each hardware offload unit return the packet to the host computer, in order for a packet processor 115 on the host computer to identify a subsequent hardware offload unit that needs to process the packet next.

Figure 2:
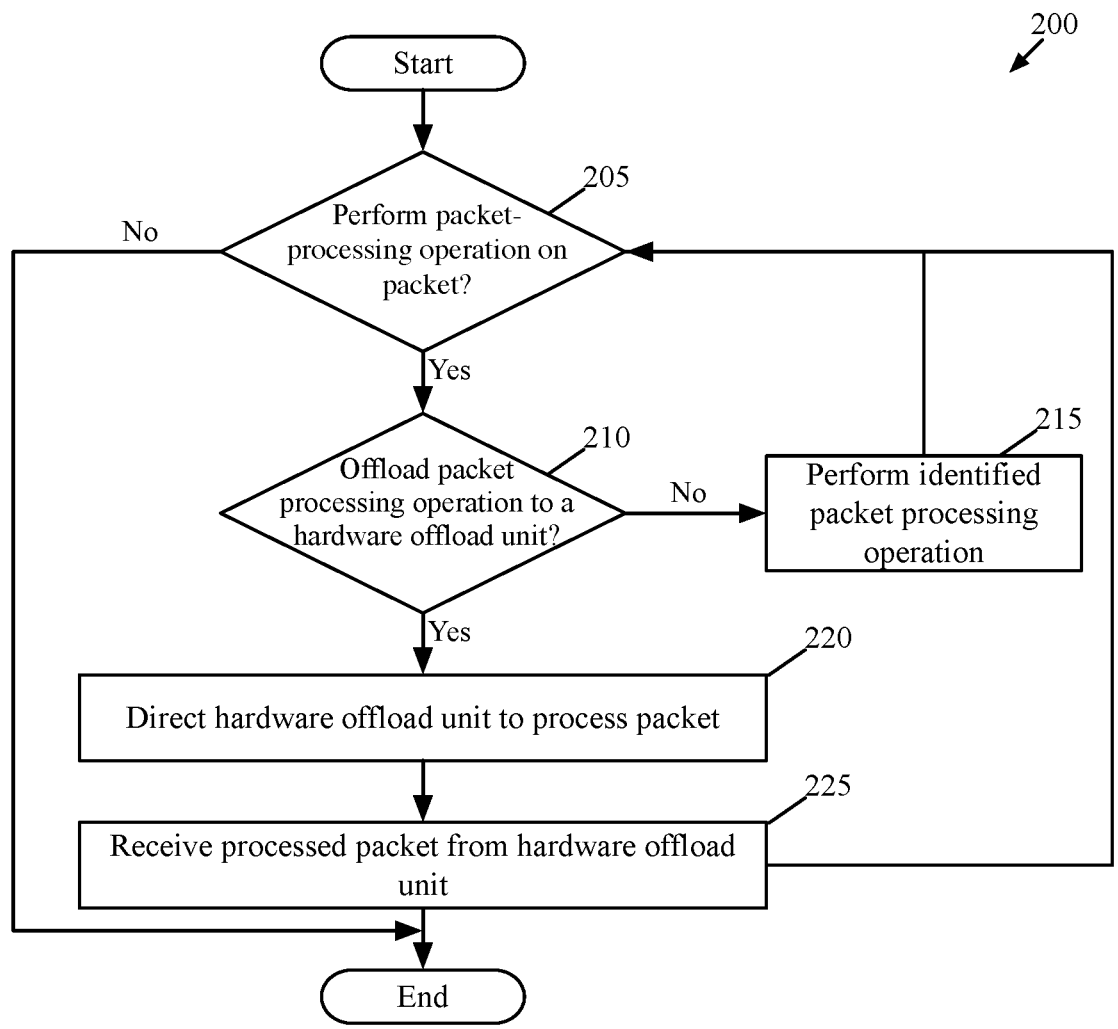
FIGS. 2 and 3 conceptually illustrate processes that a packet-processor and a hardware offload unit perform in some embodiments to process packets.
Figure 3:
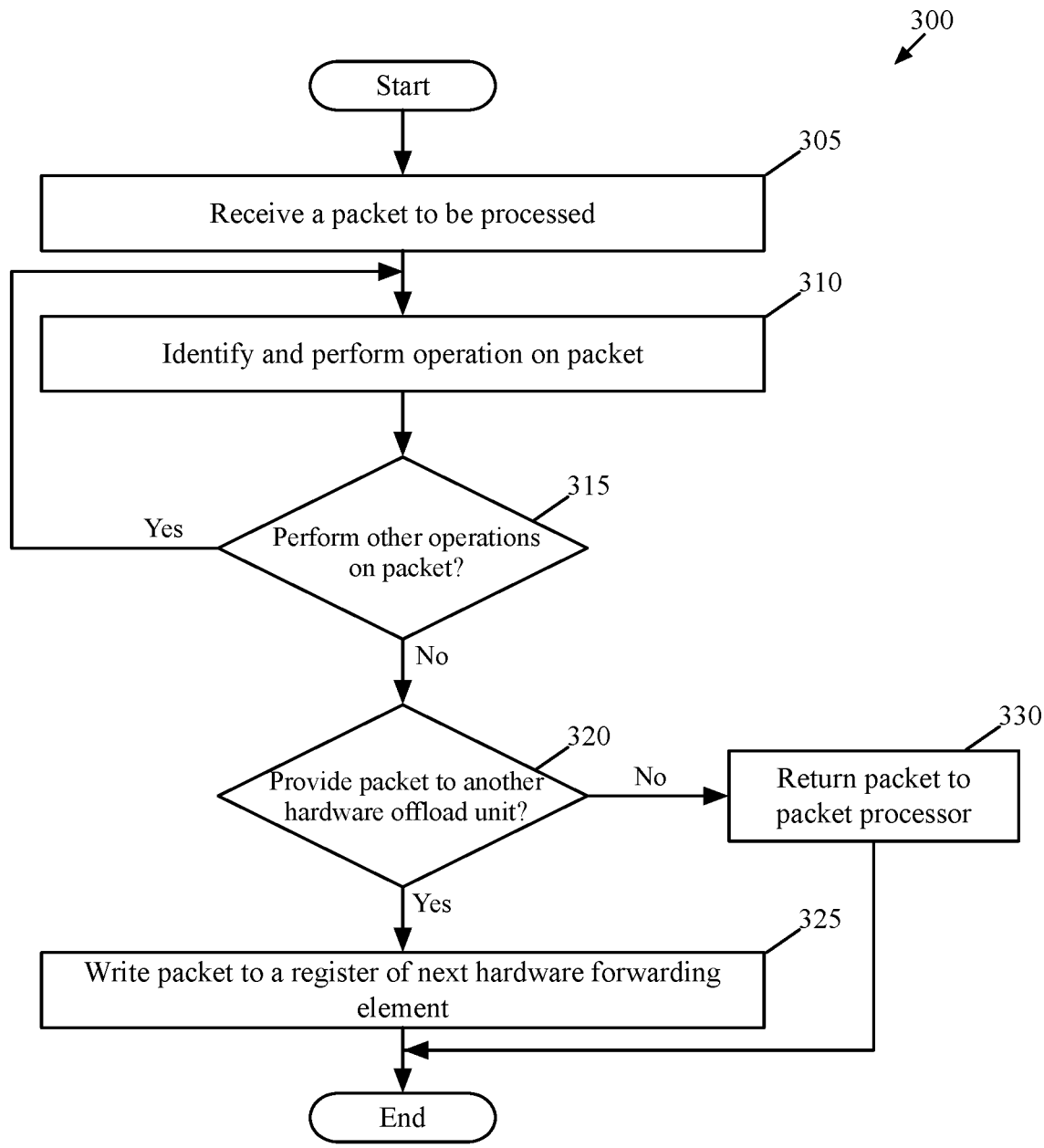

FIGS. 2 and 3 illustrate processes 200 and 300 that a packet-processor 115 and a hardware offload unit perform in some embodiments to process packets. The process 200 starts each time the packet processor 115 identifies a packet that it needs to process as the packet traverses along an ingress path to, or an egress path from, a machine 125 executing on the packet processor's host computer 100.

As shown, the process 200 initially determines (at 205) whether any packet-processing operation (e.g., forwarding or middlebox operation) has to be performed on the packet. If so, the process determines (at 210) whether the packet processing operation has to be performed by the process 200 or another software packet processor executing on the host computer, or whether the next packet processing operation should be offloaded to a hardware offload unit. In some embodiments, the process 200 uses a set of attributes of the packet (e.g., header values of the packet) to identify the packet forwarding and/or middlebox service operation to perform on the packet, and/or to determine whether it or a hardware offload unit has to process the packet.

Figure 4:
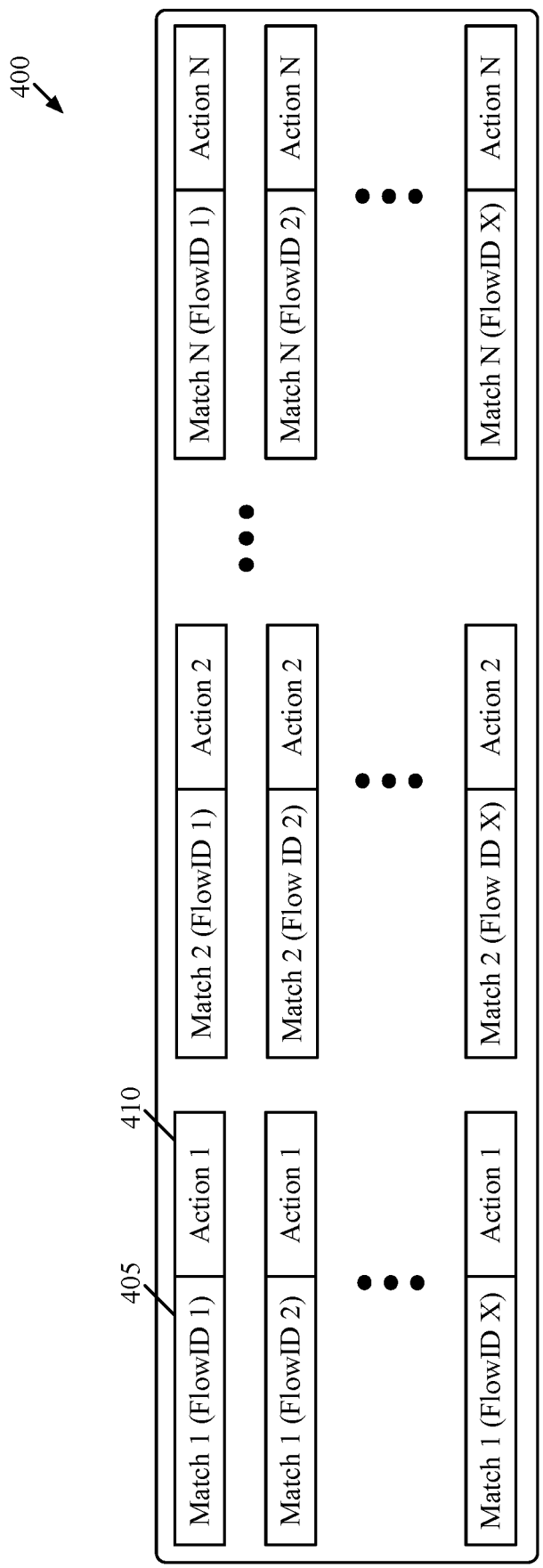
FIG. 4 conceptually illustrates examples of match-action records that the packet processor uses in some embodiments to identify a sequence of operations that have to be performed for a particular flow identifier.

FIG. 4 illustrates examples of match-action records 400 that the packet processor 115 uses in some embodiments to identify a sequence of operations that have to be performed for a particular flow identifier 405. Each record's flow identifier has a set of packet attributes (e.g., header values) that match one or more possible packet flows. Each record also specifies one or more operations 410 and an identifier 405 for a software process or a hardware offload unit for performing the operation.

When the process 200 determines (at 210) that it, or another software packet processor executing on the host computer, has to process the packet, it transitions to 215. At 215, the process 200 or the other software packet processor performs the identified packet processing operation (e.g., a forwarding or middlebox service operation), and then returns to 205. On the other hand, when the process determines (at 210) that it should offload the processing of the packet to a particular hardware offload unit, it directs (at 220) the particular hardware offload unit to process the packet, and then transitions to 225 to await this particular hardware offload unit or another hardware offload unit to return the processed packet. In some embodiments, the process 200 directs the hardware offload unit to process the packet by writing the packet to a register of the particular hardware offload unit. In other embodiments, the process 200 writes the packet to a location in the host-computer memory 110 and notifies the particular hardware offload unit that it has to retrieve the packet from the host-computer memory.

The process waits at 225 until it receives the packet from the particular hardware offload unit that it called at 220, or from another hardware offload unit that was called by this particular hardware offload unit or other hardware offload units in performing a chain of operations that started when the process called the particular hardware offload unit at 220.

After receiving the packet, the process transitions from 225 back to 205 to determine whether a software packet processor or a hardware offload unit has to perform additional operations on the packet. If so, the process 200 transitions to 210, which was described above. Otherwise, the process 200 ends.

FIG. 3 illustrates the process 300 performed by a hardware offload unit 112 after receiving a packet from a packet processor 115 or another hardware offload unit 112. As shown, the process 300 starts when the hardware offload unit receives (at 305) a packet to process. At 310, the process then identifies and performs an operation on the packet. In some embodiments, the process performs (at 310) a match-action operation, which matches the received packet's attributes (e.g., header values) with a match record, and then performs the operation specified by the action record associated with this match record.

Figure 5:
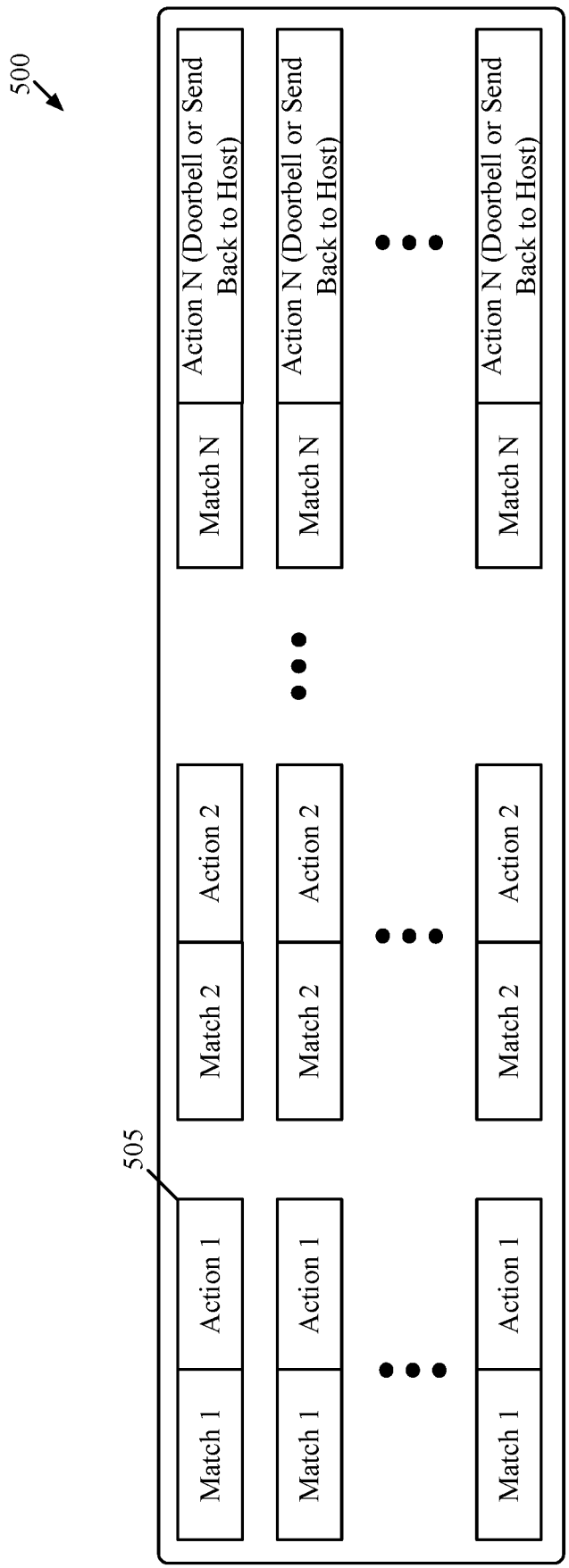
FIG. 5 conceptually illustrates an example of a packet's flow identifier being associated with multiple match-action records, with each record specifying a different operation to perform on the packets associated with the particular flow identifier.

FIG. 5 conceptually illustrates an example of a packet's flow identifier 500 being associated with multiple match-action records 505, with each record specifying a different operation to perform on the packets associated with the particular flow identifier 500. To process a packet for one or more operations, a hardware offload unit might have to perform multiple sub-operations, with each sub-operation specified by a match-action record that is processed by a different processing stage (e.g., match-action stage) in the packet-processing pipeline of the hardware offload unit.

After performing (at 310) an operation on the packet, the process 300 determines (at 315) whether it has to perform any other operations on the packet. In some embodiments, this determination involves determining whether the packet's flow identifier matches the match records of any other match-action records of any remaining packet-processing pipeline stages of the hardware offload unit that do not require providing the packet to another hardware offload unit or back to the packet processor 115.

When the process 300 determines (at 315) that it has to perform another operation on the packet, it transitions back to 310 to perform the identified operation (e.g., to perform the operation associated with the action record associated with the next match record with which packet has been matched). Otherwise, when the process determines (at 315) that the hardware offload unit does not need to perform any other operations on the packet, it determines (at 320) whether it has to provide the packet to another hardware offload unit.

This determination in some embodiment entails the process matching the packet's flow identifier with a match record that has an associated action record, which specifies the forwarding of the packet to another hardware offload unit. In some embodiments, the action record specifies a particular port of the current hardware forwarding element that is associated with the next hardware forwarding element.

When the current hardware forwarding element determines (at 320) that it has to provide the packet to another hardware offload unit, the current hardware forwarding element in some embodiments writes (at 325) the packet to a register of the next hardware forwarding element. In other embodiments, the current hardware forwarding element (at 325) writes the packet back to a memory location of the host computer, while writing a notification in the register of the next hardware forwarding element to notify it that it needs to retrieve the packet from the stored memory location on the host computer. After 325, the process 300 ends. When the process 300 determines (at 320) that it does not need to provide the packet to another hardware offload unit, it returns (at 330) the packet to the packet processor 115, and then ends.

Figure 6:
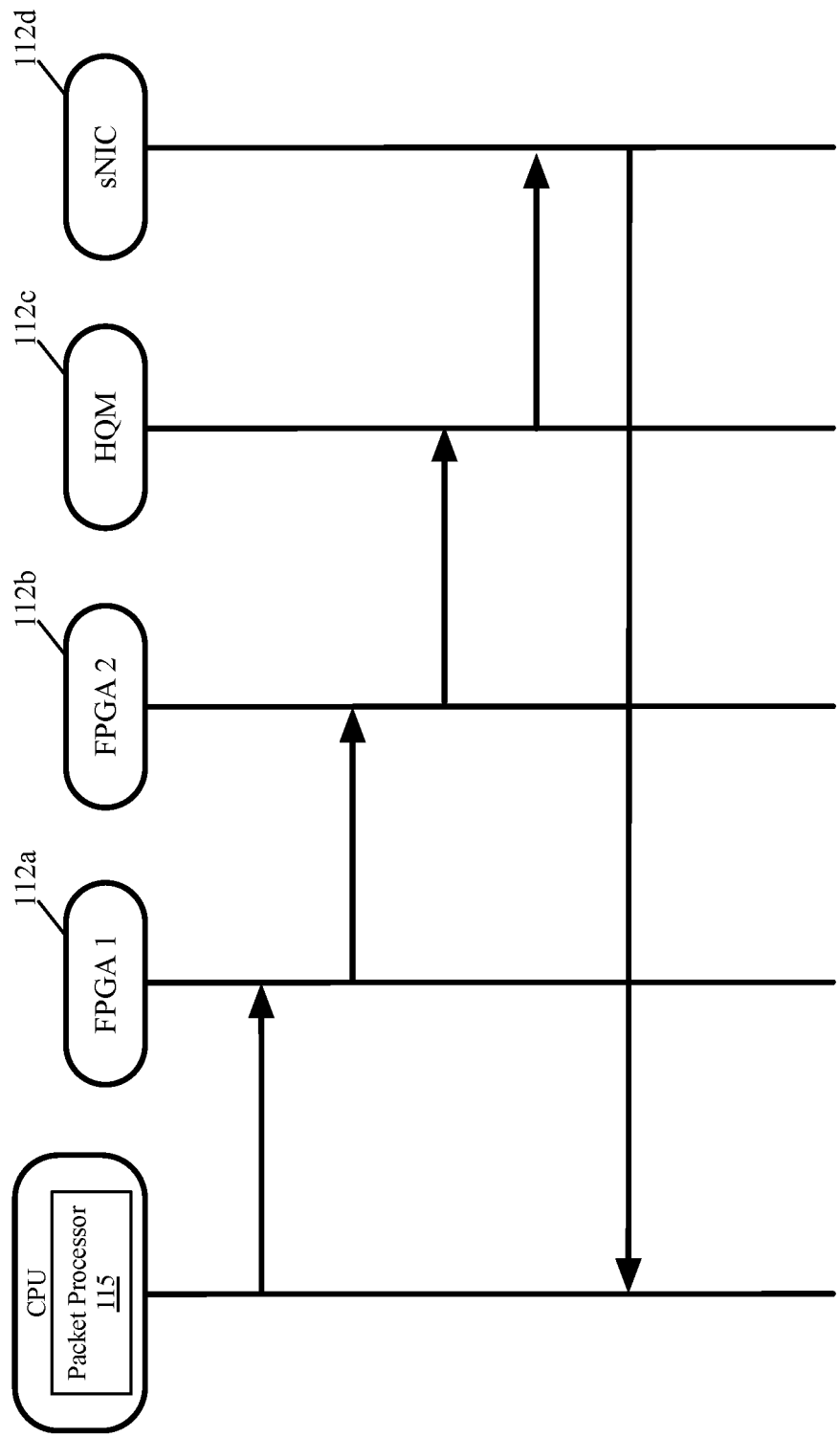
FIG. 6 conceptually illustrates an example of a packet being sequentially processed by the packet processor and the hardware offload units of the host computer.

FIG. 6 illustrates an example of a packet being sequentially processed by the packet processor 115 and the hardware offload units 112a-d of the host computer 100. The approach illustrated in this example leverages the capability of each hardware offload unit to support direct memory access (DMA) with a shared address space. Hence, as shown, the packet processor 115 (which is being executed by one or more processor units 105) provides a pointer to the initial packet to the first hardware offload unit in a chain of hardware offload units that performs a chain of packet-processing operations on the packet.

Upon receiving the pointer, the first hardware offload unit 112a can process its match/actions stages without involvement of the processing units of the host computer. The first hardware offload unit can then pass the packet to the next hardware offload unit 112b, which then performs its packet-processing operations before passing the packet to the next hardware offload unit. This process continues until all the hardware offload units have processed the packet. The communication between the hardware offload units in some embodiments is done through a doorbell mechanism where the current hardware offload unit provides a notification (i.e., pushes a "doorbell") to trigger the next hardware offload unit to read from the memory address (specified by a pointer) for its own processing. In other embodiments, this communication is achieved using a message queue where the action from the current hardware offload unit sends a request to the next hardware offload unit's request queue with enough information to trigger the next hardware offload unit to start its own pipeline.

Figure 7:
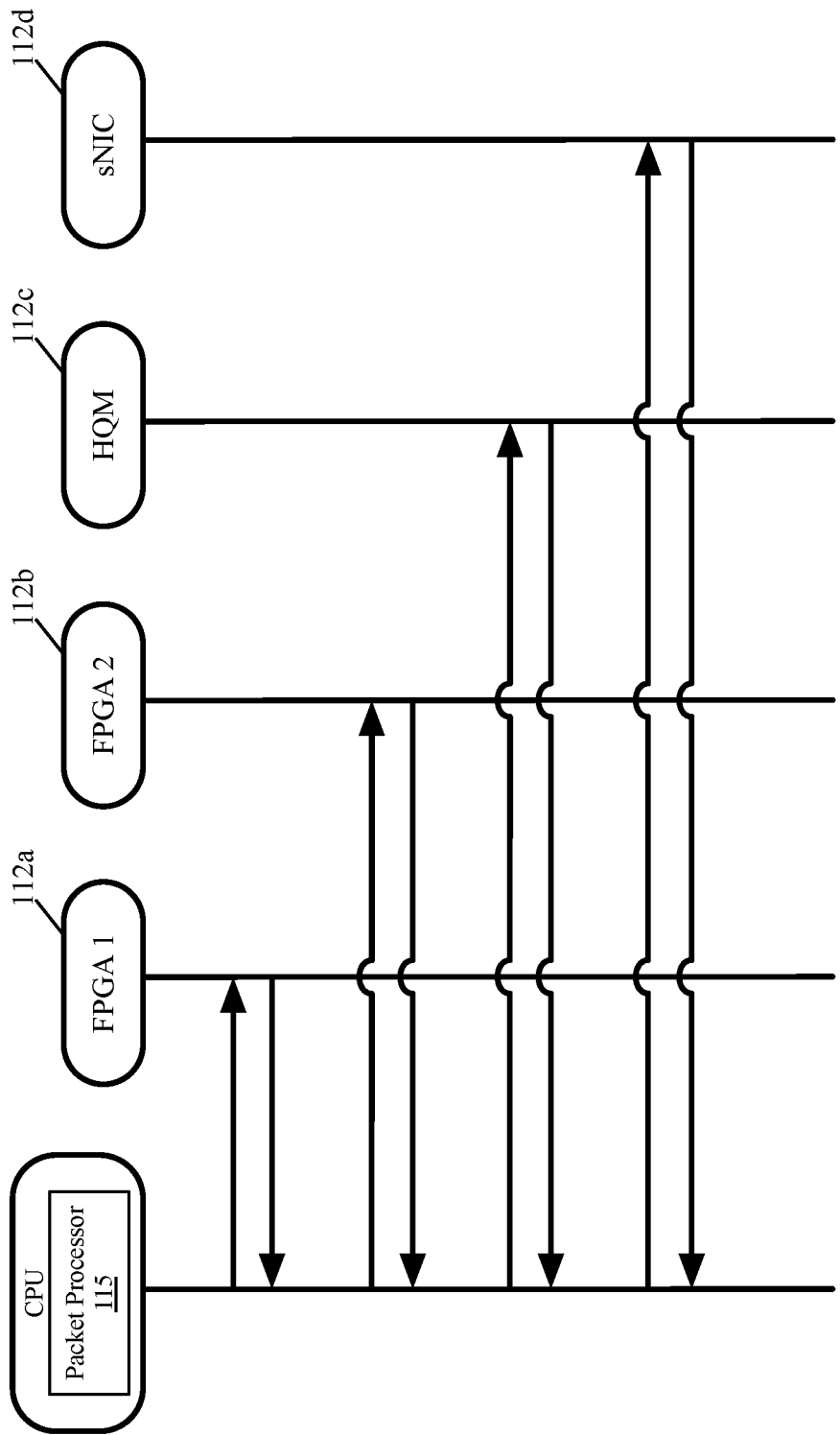
FIG. 7 conceptually illustrates an example of a CPU-centric model that performs a chain of packet processing operations on a packet.

The approach illustrated in FIG. 6 is a much better approach to CPU-centric model illustrated in FIG. 7. The approach in FIG. 7 requires the host computer's processing units to assist the hardware offload units to identify the next hardware offload units in a chain of hardware offload units that performs a chain of packet processing operations on a packet. In other words, to leverage the offloading capabilities of the hardware offload unit, the host computer's processing units need to be involved for every packet.

For example, when a packet is received by the host operating system, it will process it based on the configuration pipeline. At certain stage of this processing, say cryptography, or HQM, the host OS needs to send the packet back to a hardware offload unit and then receive it back from this unit to continue its processing. This involves multiple PCIe transactions and will also use host's processor resources to identify the next hardware offload unit to perform the next offloaded operation. Even though some of the hardware offload units can be integrated with the processor, to communicate with them might still require host processor involvement, which is costly. Based on empirical performance data, some embodiments perform offloading for certain data sizes, as offloading provides benefits for these data size as otherwise the cost of submitting the job from CPU would dominate.

Different embodiments use different techniques to allow one hardware offload unit to write to the main memory of the host computer and/or to the memory of another hardware offload unit, and then to provide notification to the second hardware offload unit that it needs to process the newly written data. Some embodiments leverage cache coherency techniques to allow the hardware offload units and the host computer communicate.

In recent years, devices have participated in cache coherency. For instance, AMD opened its cache coherent interface to RDMA adapter vendors who had designed RDMA devices that participate in cache coherence protocol of AMD processor. Similarly, after its acquisition of Altera, Intel opened up its cache-coherent protocol to Altera FPGAs, such that some Altera FPGA can participate in the cache-coherent protocol of Intel processors. And one can implement a networking accelerator or adapter using an Altera FPGA.

In some embodiments, a first hardware offload unit is cache coherent with main memory of the host computer and/or with the memory of a second hardware offload unit. The second hardware offload unit in such a case can snoop (in the cache coherent protocol sense) on the memory location to which the first hardware offload unit writes. This memory location is part of cache-coherent memory space.

It is very efficient for the second hardware offload unit to leverage the cache coherent protocol. The second hardware offload unit will maintain a cache copy of the memory location. As long as no write is done to it, the second hardware offload unit is just watching/reading/evaluating its cache copy. When the first hardware offload unit writes to this memory location, the underlying cache-coherence protocol will invalidate the cache copy in the second hardware offload unit. When the second hardware offload unit next attempts to access this memory location, it encounters a cache miss which will then pick up the value newly written by the first hardware offload unit. This sequence also enables the second hardware offload unit to know that something has changed and it can re-evaluate to decide what actions/processing it needs to take.

In some embodiments, second hardware offload unit utilizes the CXL (computer express link) cache capabilities. CXL (https://www.computeexpresslink.org) is one of the efforts that has been undertaken in recent years to enable cache-coherent interconnect between devices and processors. CXL is built on top of PCIe version 5 (PCIev5). In some embodiments, the host computers have adapter slots that are CXL/PCIev5 slots. Another recent effort to enable cache-cohere interconnect is CCIX (https://www.ccixconsortium.com) and some embodiments use this protocol.

CXL also allows a device to offer memory (CXL.mem). In some embodiments, the second hardware offload unit utilizes CXL.mem to provide memory locations, to which the first hardware offload unit can write. In short, there are many mechanisms/means by which this indication can happen. CXL is getting wide-spread industry adoption, and it greatly expands beyond what traditional PCIe offers.

In some embodiments, the second hardware offload unit that uses CXL has hardware that compares say producer and consumer register values, with the producer register being in the cached memory space snooped by the second hardware offload unit. In some such embodiments, the second hardware offload unit reads the producer register value repeatedly. When the first hardware offload writes to this producer register, the second hardware offload unit retrieves the new value, and its hardware which compares the producer and consumer registers will detect that there is work queued up for it to do.

Conjunctively with the cache coherency protocols, or instead of using cache coherency protocols, some embodiments use Peer-to-Peer transfer capabilities between two PCIe devices to establish the doorbell mechanism between two hardware offload units that are plugged into the PCIe interface of a host computer. Information regarding peer-to-peer transfers can be found at:

https://blog.exxactcorp.com/exploring-the-complexities-of-pcie-connectivity-and-peer-to-peer-communication/

In some embodiments, peer-to-peer communication is limited to DMA only, and does not support MMIO writes from one device to another's MMIO space. The ability to do DMA triggers constructs (e.g., notifications, interrupts, etc.) that notify the second hardware offload unit that it needs to process the data written through the DMA or the data written in the host memory's coherent cache. In other embodiments, peer-to-peer communication between two hardware offload units supports MMIO writes from one peer device to another peer device. Under this approach, the first hardware offload unit MMIO writes to second hardware offload unit's MMIO space, in which consumer/producer pointers reside.

FIG. 8 illustrates a network control system 800 that configures multiple hardware offload units of one or more host computers 100 to perform operations on packets associated with machines executing on these computers and to pass the packets between each other efficiently. The control system 800 includes a set of central controllers 805 executing on one or more servers, and a set of local controllers 810 executing on the host computers 100.

The central and local controllers form a control plane that configures packet processing modules executing on the host computers to perform packet processing operations and/or to provide packets to hardware offload units to perform packet processing operation. The packets in some embodiments are packets sent by machines (e.g., VMs or containers) executing on the host computers and/or are packets received for these machines. Also, in some embodiments, the packet processing modules are modules of the operating system of the host computer, while in other embodiments, these modules are modules of a hypervisor over which virtual machines and/or containers execute on the host computer.

In addition to configuring the packet processing modules to offload some or all of the packet processing onto one or more hardware offload units, the control plane of some embodiments configures one or more hardware offload units of a host computer to perform the packet processing operations on the packets, to identify other hardware offload units that have to perform subsequent operation on the packets, to provide the packets to the subsequent hardware offload units, and to return the packets back to the packet processing modules (executing on the offload unit's host computers) when the packets do not need to be processed subsequently by another hardware offload unit.

In some embodiments, the control plane configures a hardware offload unit to provide the packet to another hardware offload unit by writing to a register of the other hardware offload unit. In other embodiments, the process configures a hardware offload unit to provide the packet to another hardware offload unit by writing to a memory of the host computer, and providing a notification to the second hardware offload unit that it needs to retrieve the packet from the host computer's memory.

In some embodiment, the control plane configures the packet processing modules executing on the host computers to perform packet-processing operations on the packets (1) before providing the packets to any hardware offload units, (2) after the hardware offload units have performed the offload operations, and/or (3) after several hardware offload units (e.g., two or more hardware offload units) have performed some of the offloaded operations but before several other hardware offload units (e.g., two or more hardware offload units) have performed some of the other offloaded operations.

As mentioned above, the packet-processing operations performed by a host's packet-processing modules and/or hardware offload units includes in some embodiments packet forwarding operations and/or middlebox service operations. Also, in some embodiments, the control plane configures these modules and/or hardware offload units to use sets of packet attributes (e.g., packet header values) to identify the packet forwarding and/or middlebox service operation to perform on the packet, and/or to identify the processing modules and/or hardware offload units to process the packets next.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Some embodiments include electronic components, such as microprocessors, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

FIG. 9 conceptually illustrates a computer system 900 with which some embodiments of the invention are implemented. The computer system 900 can be used to implement any of the above-described hosts, controllers, and managers. As such, it can be used to execute any of the above described processes. This computer system includes various types of non-transitory machine readable media and interfaces for various other types of machine readable media. Computer system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the computer system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments. The read-only-memory (ROM) 930 stores static data and instructions that are needed by the processing unit(s) 910 and other modules of the computer system. The permanent storage device 935, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such as random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select requests to the computer system. The input devices 940 include alphanumeric keyboards and pointing devices (also called "cursor control devices"). The output devices 945 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 9, bus 905 also couples computer system 900 to a network 965 through a network adapter (not shown). In this manner, the computer can be a part of a network of computers (such as a local area network ("LAN"), a wide area network ("WAN"), or an Intranet), or a network of networks (such as the Internet). Any or all components of computer system 900 may be used in conjunction with the invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for performing a plurality of operations on a packet with a plurality of hardware offload units of a host computer on which a plurality of machines execute, the method comprising:
   configuring a program, over which the plurality of machines execute on the host computer, to identify a first hardware offload unit, of the host computer, that has to perform a first operation on a packet associated with a particular machine and to provide the packet to the first hardware offload unit to perform the first operation on the packet, the first hardware offload unit being configured to process an actions stage without involvement of processing units of the host computer;
   configuring the first hardware offload unit to perform the first operation on the packet, to identify a second hardware offload unit, of the host computer, that has to perform a second operation on the packet, and to provide the packet to the second hardware offload unit; and
   configuring the second hardware offload unit to perform the second operation on the packet.

2. The method of claim 1, wherein configuring the first hardware offload unit to provide the packet comprises configuring the first hardware offload unit to write to a register of the second hardware offload unit.

3. The method of claim 1, wherein configuring the first hardware offload unit to provide the packet comprises configuring the first hardware offload unit to write to a memory of the host computer, said writing causing a notification to be provided to the second hardware offload unit without using any processing unit of the host computer.

4. The method of claim 1 further comprising configuring the second hardware offload unit to provide the packet back to the program after performing the second operation on the packet.

5. The method of claim 1 further comprising:
   configuring the second hardware offload unit to provide the packet, after performing the second operation on the packet, to a third hardware offload unit; and
   configuring the third hardware offload unit to perform a third operation on the packet.

6. The method of claim 1, wherein the program is an operating system of the host computer.

7. The method of claim 1, wherein the program is a hypervisor executing on the host computer, and the plurality of machines comprise virtual machines.

8. The method of claim 1, wherein the program is an operating system executing on the host computer, and the plurality of machines comprise containers or Pods.

9. The method of claim 1 further comprising configuring the program to perform a third operation on the packet before providing the packet to the first hardware offload unit to perform a first operation.

10. The method of claim 1, wherein the packet is a packet that the particular machine has sent to a destination machine on the network, or is a packet received from a source machine through a network and destined to the particular machine, the packet comprising a header and a payload.

11. The method of claim 1, wherein the each of the first and second operations is a packet forwarding operation or a packet middlebox service operation.

12. The method of claim 1, wherein the program uses a set of attributes of the packet to determine that the first hardware offload unit has to perform the first operation on the packet.

13. The method of claim 12, wherein the first hardware offload unit uses the set of attributes of the packet to determine that the second hardware offload unit has to perform the second operation on the packet.

14. The method of claim 1, wherein the program uses a set of attributes of the packet to identify a plurality of operations that have to be performed by a plurality of hardware offload units on the packet, and provides to the first hardware offload unit the packet along with an identifier for each hardware offload unit that has to perform an operation on the packet.

15. A non-transitory machine readable medium storing a first program for execution by at least one processing unit of a computer to configure hardware offload units of a host computer to perform a plurality of operations on a packet, a plurality of machines executing on the host computer, the first program comprising sets of instructions for:
   configuring a second program, over which the machines execute, to identify a first hardware offload unit that has to perform a first operation on a packet associated with a particular machine and to provide the packet to the first hardware offload unit, the first hardware offload unit being configured to process an actions stage without involvement of processing units of the host computer;
   configuring the first hardware offload unit to perform the first operation on the packet, to identify a second hardware offload unit that has to perform a second operation on the packet, and to provide the packet to the second hardware offload unit; and
   configuring the second hardware offload unit to perform the second operation on the packet.

16. The non-transitory machine readable medium of claim 15, wherein the set of instructions for configuring the first hardware offload unit to provide the packet comprises a set of instructions for configuring the first hardware offload unit to write to a register of the second hardware offload unit.

17. The non-transitory machine readable medium of claim 15, wherein the set of instructions for configuring the first hardware offload unit to provide the packet comprises a set of instructions for configuring the first hardware offload unit to write to a memory of the host computer, said writing causing a notification to be provided to the second hardware offload unit without using any processing unit of the host computer.

18. The non-transitory machine readable medium of claim 15, wherein the first program further comprises a set of instructions for configuring the second hardware offload unit to provide the packet back to the second program after performing the second operation on the packet.

19. The non-transitory machine readable medium of claim 15, wherein the first program further comprises sets of instructions for:
    configuring the second hardware offload unit to provide the packet, after performing the second operation on the packet, to a third hardware offload unit; and
    configuring the third hardware offload unit to perform a third operation on the packet.

20. The non-transitory machine readable medium of claim 15, wherein the second program is an operating system of the host computer.

* * * * *